(12) United States Patent
Toba

(10) Patent No.: US 12,061,144 B2
(45) Date of Patent: Aug. 13, 2024

(54) ROAD SURFACE FRICTION COEFFICIENT ESTIMATING DEVICE

(71) Applicant: JTEKT CORPORATION, Osaka (JP)

(72) Inventor: Hiroyasu Toba, Anjo (JP)

(73) Assignee: JTEKT CORPORATION, Osaka (JP)

( * ) Notice: Subject to any disclaimer, the term of this patent is extended or adjusted under 35 U.S.C. 154(b) by 471 days.

(21) Appl. No.: 17/204,518

(22) Filed: Mar. 17, 2021

(65) Prior Publication Data

US 2021/0310932 A1 Oct. 7, 2021

(30) Foreign Application Priority Data

Mar. 31, 2020 (JP) ................................. 2020-063837

(51) Int. Cl.
*G01N 19/02* (2006.01)
*B60W 40/068* (2012.01)

(52) U.S. Cl.
CPC .......... *G01N 19/02* (2013.01); *B60W 40/068* (2013.01); *B60W 2520/125* (2013.01); *B60W 2520/14* (2013.01)

(58) Field of Classification Search
CPC ............... G01N 19/02; B60W 40/068; B60W 2520/125; B60W 2520/14; B60W 2510/202; B60W 2540/18; B60W 2556/10
See application file for complete search history.

(56) References Cited

U.S. PATENT DOCUMENTS

2011/0130974 A1 6/2011 Yngve et al.

FOREIGN PATENT DOCUMENTS

| JP | 2009-133680 A | 6/2009 |
|----|---------------|--------|
| JP | 5707790 B2    | 4/2015 |

OTHER PUBLICATIONS

Chen et al., Real-Time Identification of the Tyre-Road Friction Coefficient Using an Unscented Kalman Filter and Mean-Square-Error-Weighted Fusion, 2016, Proc IMechE Part D, J Automobile Engineering, vol. 230(6), pp. 788-802 (Year: 2016).*
Yoon et al.: "Estimation of vehicle sideslip angle and tire-road friction coefficient based on magnetometer with GPS;" International Journal of Automotive Technology, the Korean Society of Automotive Engineers, Heidelberg; 2016; pp. 427-435; vol. 17, No. 3.

(Continued)

*Primary Examiner* — Toan M Le
(74) *Attorney, Agent, or Firm* — Oliff PLC

(57) ABSTRACT

A road surface friction coefficient estimating device includes an electronic control unit. The electronic control unit is configured to: compute a system noise variance value as an index indicating a degree of variation in a road surface friction coefficient estimation value; compute an observation noise variance value as an index indicating a degree of variation in observation noise; compute, with regard to an observation deviation, an index indicating a degree of shift of the observation deviation that is newly obtained as to an index indicating a degree of past variation in the observation deviation; compute the index as a friction coefficient change amount; compute a Kalman gain; and add in the friction coefficient change amount when computing the system noise variance value.

3 Claims, 5 Drawing Sheets

(56) References Cited

OTHER PUBLICATIONS

Li et al; "A Reliable Fusion Methodology for Simultaneous Estimation of Vehicle Sideslip and Yaw Angles;" IEEE Transactions on Vehicular Technology; 2016; pp. 4440-4458; vol. 65, No. 6.
Reina et al; "Vehicle dynamics estimation via augmented Extended Kalman Filtering;" Measurement, Institute of Measurement and Control; 2018; pp. 383-395; vol. 133, No. 11.
Jul. 30, 2021 Extended Search Report issued in European Patent Application No. 21164534.6.

\* cited by examiner

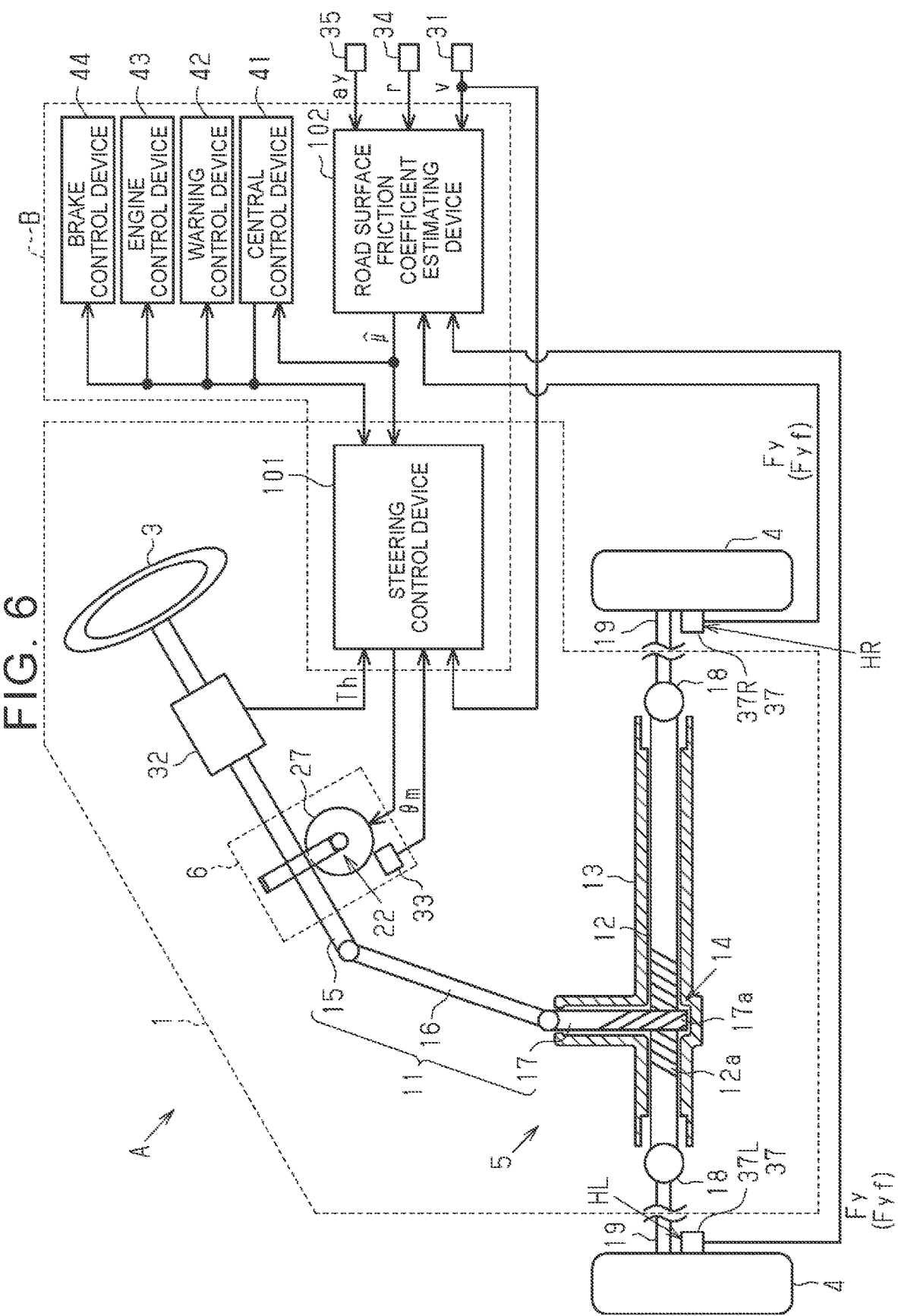

ROAD SURFACE FRICTION COEFFICIENT ESTIMATING DEVICE

CROSS-REFERENCE TO RELATED APPLICATION

This application claims priority to Japanese Patent Application No. 2020-063837 filed on Mar. 31, 2020, incorporated herein by reference in its entirety.

BACKGROUND

1. Technical Field

The disclosure relates to a road surface friction coefficient estimating device.

2. Description of Related Art

There are arrangements in which an observer is configured based on an equation of state that is obtained from an equation of motion of a vehicle, and an observation equation that indicates an observed value (e.g., Japanese Patent No. 5707790 (JP 5707790 B)). JP 5707790 B discloses a road surface friction coefficient estimating device that enables a road surface friction coefficient ($\mu$) of a road surface, over which a vehicle is traveling, to be estimated.

The road surface friction coefficient estimating device described in JP 5707790 B is arranged to raise the estimation precision of the road surface friction coefficient, which is an estimated value of the road surface friction coefficient, by configuring an extended Kalman filter as an observer, taking into consideration inclusion of noise in observed values.

SUMMARY

Now, when a vehicle enters a frozen road from an asphalt-paved road, for example, the actual road surface friction coefficient of the road surface over which the vehicle is traveling can be expected to change greatly before and after. Under such situations, the road surface friction coefficient estimation value cannot follow the great change in the actual road surface friction coefficient when the estimation responsivity is insufficient for obtaining high precision for the estimation precision of the road surface friction coefficient estimation value. That is to say, there is a possibility that a difference will occur between the actual road surface friction coefficient and the estimated value of the road surface friction coefficient in a situation in which the actual road surface friction coefficient greatly and rapidly changes, and the estimation precision of the road surface friction coefficient estimation value deteriorates.

The disclosure is able to suppress deterioration in estimation precision of the road surface friction coefficient estimation value even in a situation in which the actual road surface friction coefficient greatly and rapidly changes.

An aspect of the disclosure is a road surface friction coefficient estimating device. The road surface friction coefficient estimating device is configured to compute a road surface friction coefficient estimation value that is an estimation value of a road surface friction coefficient of a road surface using a nonlinear Kalman filter having an observed value containing the road surface friction coefficient as a variable. The road surface friction coefficient estimating device includes an electronic control unit. The electronic control unit is configured to compute a system noise variance value as an index indicating a degree of variation in the road surface friction coefficient estimation value. The electronic control unit is configured to compute an observation noise variance value as an index indicating a degree of variation in observation noise being noise that the observed value contains. The electronic control unit is configured to compute, with regard to an observation deviation, an index indicating a degree of shift of the observation deviation that is newly obtained as to an index indicating a degree of past variation in the observation deviation. The observation deviation is deviation between an observation estimation value the observed value. The observation estimation value is an estimation value of the observed value obtained in computation of the road surface friction coefficient estimation value. The electronic control unit is configured to compute the index as a friction coefficient change amount that indicates an amount of change of the road surface friction coefficient. The electronic control unit is configured to compute a Kalman gain that indicates a correction amount of the road surface friction coefficient estimation value in the nonlinear Kalman filter, based on the system noise variance value and the observation noise variance value. The electronic control unit is configured to add in the friction coefficient change amount when computing the system noise variance value.

According to the above configuration, the observed value includes the road surface friction coefficient as a variable, and accordingly when there is change in the actual road surface friction coefficient, the effects thereof are manifested as the degree of variation regarding the observation deviation. That is to say, the degree of variation in observation deviation can be used as an index regarding the degree of change of the road surface friction coefficient. Accordingly, when there is change in the actual road surface friction coefficient, the system noise variance value computed adding in the friction coefficient change amount as an index indicating the degree of variation in the road surface friction coefficient estimation value will change in accordance with the amount of change thereof. A change in the system noise variance value means a change in the Kalman gain computed based on the system noise variance value. As a result, the road surface friction coefficient estimation value is computed as a value corrected under the Kalman gain corresponding to the friction coefficient change amount.

According to the above configuration, when a vehicle enters a frozen road from an asphalt road or the like, for example, and the actual road surface friction coefficient changes, this change can be detected as the friction coefficient change amount. Now, when the friction coefficient change amount is great, the Kalman gain changes so as to make the correction amount of the road surface friction coefficient estimation value larger, based on the system noise variance value in which the friction coefficient change amount is added in. In this case, the estimation responsivity of the road surface friction coefficient estimation value can be temporarily increased. Accordingly, in a situation in which the actual road surface friction coefficient greatly and rapidly changes, the change can be quickly detected and this change can be promptly followed. Thus, even in a situation when the actual road surface friction coefficient greatly and rapidly changes, deterioration in estimation precision of the road surface friction coefficient estimation value can be suppressed.

In the road surface friction coefficient estimating device, the friction coefficient change amount may be computed as a coefficient of the system noise variance value such that the system noise variance value is proportionate to the friction coefficient change amount.

In the road surface friction coefficient estimating device, the friction coefficient change amount may be, presuming that an information group configured of indices indicating the degree of past variation in the observation deviation exists, a Mahalanobis distance that quantitively indicates the degree of shift of the observation deviation that is newly obtained as to the information group.

Now, the Mahalanobis distance has a feature in that distance is quantitatively detected taking in to consideration correlation regarding the degree of shift of newly-obtained information as to a past information group. That is to say, according to the above configuration, using the Mahalanobis distance as a coefficient of the system noise variance value enables the change in the actual road surface friction coefficient to be quantitatively reflected in the system noise variance value. Accordingly, change in the actual road surface friction coefficient is reflected in the Kalman gain through the system noise variance value, and estimation responsivity corresponding to the change in the actual road surface friction coefficient is set. Thus, the road surface friction coefficient estimation value can be computed with an estimation responsivity appropriate for the change in the actual road surface friction coefficient.

In the road surface friction coefficient estimating device, at least lateral acceleration and yaw rate occurring in a vehicle, and aligning torque at a center of steering when viewing a steered wheel of the vehicle from above, may be included as the observed value.

In the road surface friction coefficient estimating device, the nonlinear Kalman filter may be an extended Kalman filter. According to this configuration, using the extended Kalman filter for the nonlinear Kalman filter is advantageous in that the versatility of the road surface friction coefficient estimating device is increased.

According to the above configuration, deterioration in estimation precision of the road surface friction coefficient estimation value can be suppressed even in a situation in which the actual road surface friction coefficient greatly changes.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 a schematic configuration diagram of a vehicle control device according to a second embodiment.

DETAILED DESCRIPTION OF EMBODIMENTS

First Embodiment

A first embodiment, in which a road surface friction coefficient estimating device is applied to a vehicle control device that controls operations of a vehicle, will be described below with reference to the drawings.

Figure 1:
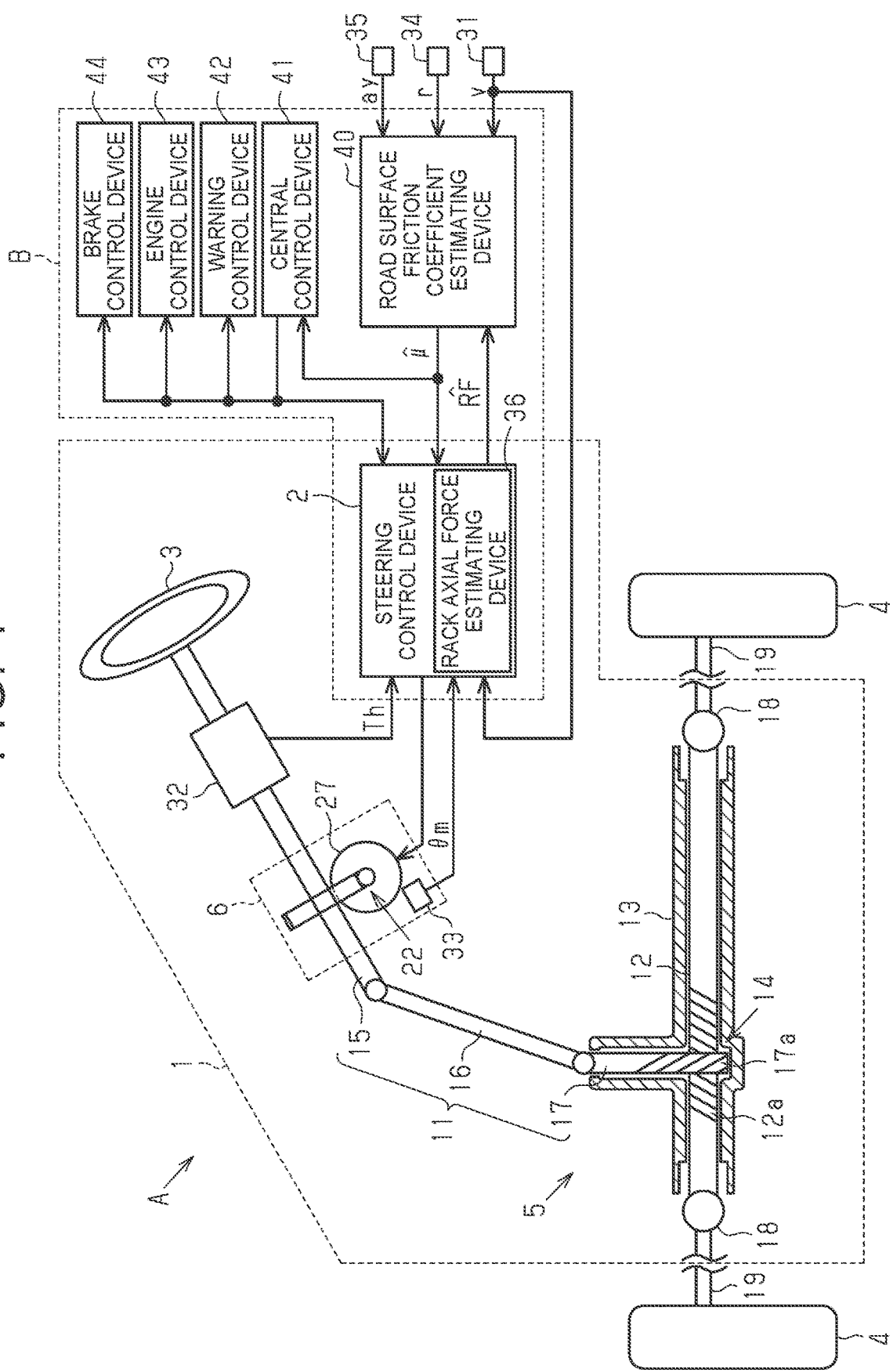
FIG. 1 is a schematic configuration diagram of a vehicle control device according to a first embodiment.

As illustrated in FIG. 1, a vehicle A is provided with a vehicle control device B that controls the operations of the vehicle A. The vehicle A is provided with a steering device 1 that is the object of control by the vehicle control device B. The steering device 1 is provided with a steering control device 2 that controls operations of the steering device 1. The steering control device 2 controls operations of the steering device 1 in the vehicle control device B as operations of the vehicle A. The steering device 1 is provided with a steering mechanism 5 that steers steered wheels 4 based on steering operations, which are operations of a steering wheel 3 performed by a driver. The steering device 1 is also provided with an actuator 6 that applies assisting force to the steering mechanism 5 to assist with the steering operations. That is to say, in the present embodiment, the steering device 1 is an electric power steering device that assists the driver with steering operations.

The steering mechanism 5 is provided with a steering shaft 11 to which the steering wheel 3 is fixed, a rack shaft 12 that is a steered shaft linked to the steering shaft 11, and a rack housing 13 that is a housing through which the rack shaft 12 is passed so as to be capable of reciprocal movement. The steering mechanism 5 is also provided with a rack and pinion mechanism 14 that converts rotation of the steering shaft 11 into reciprocal movement of the rack shaft 12 in the axial line direction thereof. Note that the steering shaft 11 is configured by linking a column shaft 15, an intermediate shaft 16, and a pinion shaft 17, in that order from the side at which the steering wheel 3 is situated.

The rack shaft 12 and the pinion shaft 17 are disposed in the rack housing 13 with a predetermined intersection angle therebetween. The rack and pinion mechanism 14 is configured by rack teeth 12a provided on the rack shaft 12 and pinion teeth 17a provided on the pinion shaft 17 being meshed. At both ends of the rack shaft 12, tie rods 19 are each driveably linked thereto through rack ends 18 configured of ball joints provided at the shaft end portions thereof. The tips of the tie rods 19 are linked to knuckles that are omitted from illustration, to which the steered wheels 4 are attached. Accordingly, in the steering device 1, rotation of the steering shaft 11 in accordance with steering operations is converted into movement in the axial direction of the rack shaft 12 by the rack and pinion mechanism 14, and this axial direction movement is transmitted to the knuckles through the tie rods 19, thereby changing the steered angle of the steered wheels 4, i.e., the direction of travel of the vehicle.

The actuator 6 is provided with a motor 27 that is a drive source, and a speed reducing mechanism 22 such as a worm and wheel. The motor 27 is linked to the column shaft 15 via the speed reducing mechanism 22. The actuator 6 reduces the rotations of the motor 27 by the speed reducing mechanism 22, and transmits the reduced rotations to the column shaft 15, thereby applying the motor torque to the steering mechanism 5. Note that a three-phase brushless motor is employed for the motor 27 in the present embodiment.

The steering control device 2 is connected to the motor 27, and controls the operations thereof. The steering control device 2 is provided with a central processing unit (CPU) and memory, which are omitted from illustration, and the CPU executes a program stored in the memory at each predetermined computation cycle. Thus, various types of control are carried out.

Connected to the steering control device 2 is a vehicle speed sensor 31 that detects a vehicle speed value V of the vehicle, and a torque sensor 32 that detects steering torque Th that steering operations by the driver applies to the steering shaft 11. Also connected to the steering control device 2 is a rotation sensor 33 that detects a rotational angle θm of the motor 27 over a 360° range. Note that the steering torque Th and the rotational angle θm are detected as positive values when steering in the right direction, and as negative values when steering in the left direction, for example. The steering control device 2 controls operations of the actuator 6, i.e., assisting force applied to the steering mechanism 5 so as to reciprocally move the rack shaft 12, by supplying driving electric power to the motor 27 based on signals input from these various sensors that indicate variables that change in accordance with the traveling state of the vehicle A.

Also, the vehicle control device B includes a road surface friction coefficient estimating device 40, a central control device 41, a warning control device 42, an engine control device 43, and a brake control device 44. The road surface friction coefficient estimating device 40 provides the devices 2, 41 with information relating to a road surface friction coefficient of the road surface over which the vehicle A is traveling, which is information that enables the vehicle control device B to carry out optimal control when controlling operations of an object of control. In the present embodiment, information relating to the road surface friction coefficient is a road surface friction coefficient estimation value μe that is information of estimating the actual road surface friction coefficient. Based on the road surface friction coefficient estimation value μe provided by the road surface friction coefficient estimating device 40, when the road surface friction coefficient estimation value μe is low and determination is made that the vehicle A has entered a frozen road, etc., the steering control device 2 notifies the driver thereof through control of the actuator 6 of the steering device 1, performs assistance such that the traveling of the vehicle A stabilizes, etc. Note that in the following description, estimation values are represented by appending an "e" instead of using the "^ (hat)" symbol.

The central control device 41 controls the steering control device 2, the warning control device 42, the engine control device 43, and the brake control device 44 in the vehicle control device B. The central control device 41 also issues various types of instructions, to centrally control the steering control device 2, the warning control device 42, the engine control device 43, and the brake control device 44 based on the road surface friction coefficient estimation value μe provided by the road surface friction coefficient estimating device 40 such that the vehicle A can travel safely.

The warning control device 42 controls operations of various types of warning devices, omitted from illustration, provided in the vehicle A for notifying the driver and so forth of various types of abnormalities, based on instructions from the central control device 41. Based on instructions from the central control device 41, the warning control device 42 issues warnings that the road surface friction coefficient estimation value μe is low and that the vehicle A has entered a frozen road, etc.

Based on instructions from the central control device 41, the engine control device 43 controls operations of, for example, an unshown engine that is an internal combustion engine installed in the vehicle A. The engine control device 43 changes the revolutions of the engine when the vehicle A enters, for example, a frozen road where the road surface friction coefficient estimation value μe is low, so as to stabilize traveling of the vehicle A, based on instructions from the central control device 41.

Based on instructions from the central control device 41, the brake control device 44 controls operations of an unshown brake mechanism installed in the vehicle A. The brake control device 44 changes a braking amount of the brake mechanism when the vehicle A enters a frozen road where the road surface friction coefficient estimation value μe is low, etc., so as to stabilize traveling of the vehicle A, based on instructions from the central control device 41.

Now the road surface friction coefficient estimating device 40 will be described in detail. Connected to the road surface friction coefficient estimating device 40 are, in addition to the vehicle speed sensor 31 that detects the vehicle speed value V of the vehicle, a yaw rate sensor 34 that detects a yaw rate r, which is the rotational angular velocity about an up-down direction z axis that passes through the center of gravity of the vehicle A, and a lateral acceleration sensor 35 that detects lateral acceleration ay that is acceleration in a y axis direction that is a width direction perpendicular to a front-rear direction of the vehicle A. Also, a rack axial force estimation value RFe output by a rack axial force estimating device 36, which is a function configured in the steering control device 2, is input to the road surface friction coefficient estimating device 40. The rack axial force estimating device 36 is configured of an observer, etc. that computes the rack axial force estimation value RFe, which is information estimating the rack axial force that is axial force acting on the rack shaft 12 based on information obtained at the steering control device 2. Upon computing the rack axial force estimation value RFe, the rack axial force estimating device 36 outputs this rack axial force estimation value RFe so as to be provided to the road surface friction coefficient estimating device 40. In the present embodiment, the rack axial force estimating device 36 functions as a sensor to detect rack axial force. That is to say, the rack axial force estimating device 36 functioning as a sensor to detect rack axial force is connected to the road surface friction coefficient estimating device 40. The road surface friction coefficient estimating device 40 computes the road surface friction coefficient estimation value μe with signals indicating physical quantities that change depending on the traveling state of the vehicle A, which are input from these sensors, as variables.

Next, the functions of the road surface friction coefficient estimating device 40 will be described. The road surface friction coefficient estimating device 40 is provided with a central processing unit (CPU) and memory, which are omitted from illustration, and the CPU executes a program stored in the memory at each predetermined computation cycle. Thus, various types of control are carried out.

Figure 2:
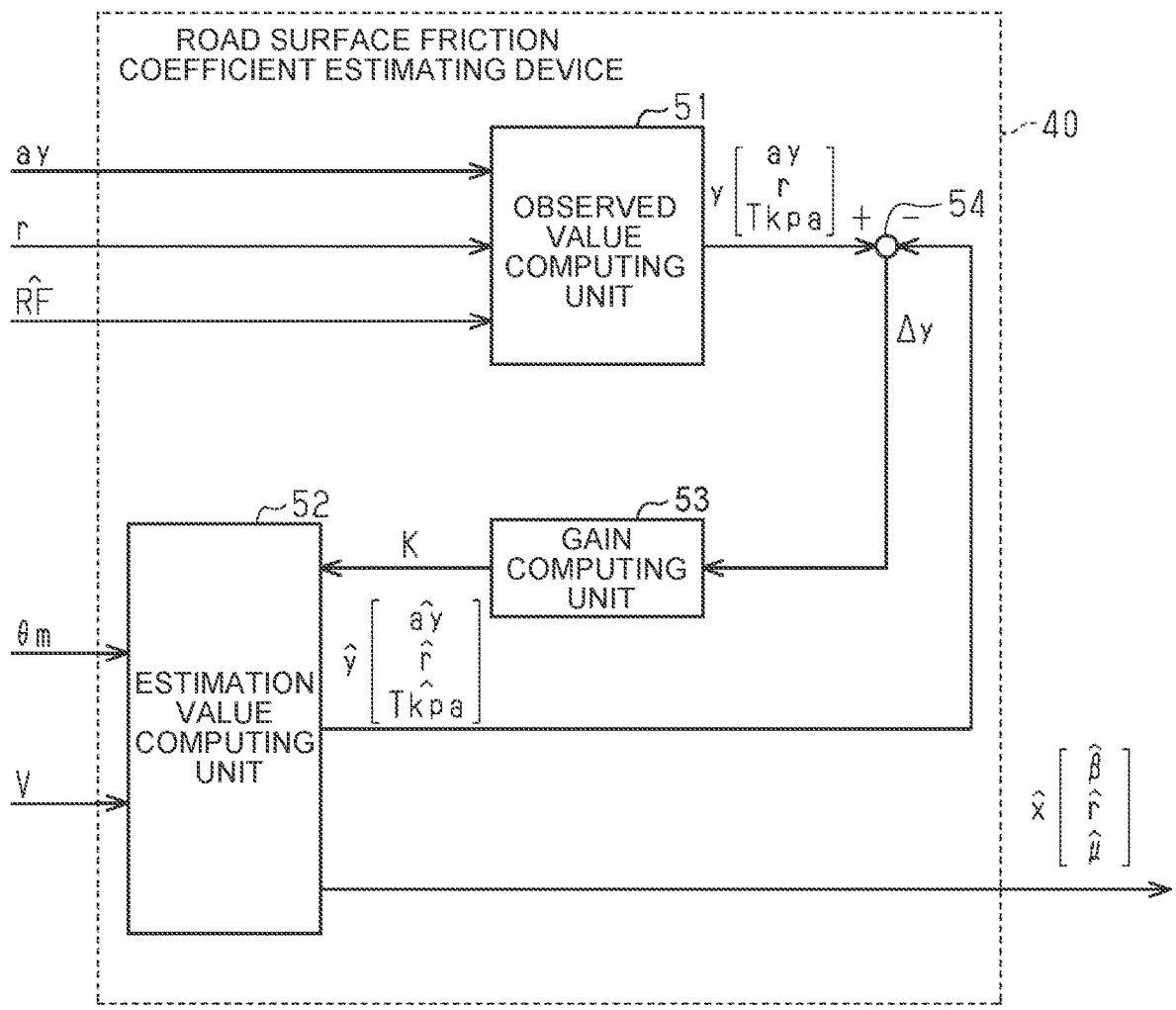
FIG. 2 is a block diagram illustrating functions of a road surface friction coefficient estimating device.

FIG. 2 illustrates part of the processing that the road surface friction coefficient estimating device 40 carries out. The processing illustrated in FIG. 2 is part of processing realized by the CPU executing a program stored in the memory, listed by types of processing realized.

The road surface friction coefficient estimating device 40 has an observed value computing unit 51 that computes an observable y necessary to compute a state estimate xe, which is an output of an estimation value that has the road surface friction coefficient estimation value μe as a state variable. The road surface friction coefficient estimating device 40 also is provided with an estimation value computing unit 52 that, along with computing the state estimate xe, computes an observation estimate ye that is information of estimation of the observable y and that is necessary for computing the state estimate xe. The road surface friction coefficient estimating device 40 also is provided with a gain computing unit 53 that computes a Kalman gain K representing a correction amount of the state estimate xe, which is an estimation value at a later-described extended Kalman filter.

Specifically, the lateral acceleration ay, the yaw rate r, and the rack axial force estimation value RFe are input to the observed value computing unit 51. The observed value computing unit 51 computes a kingpin torque Tkpa that is force about a kingpin shaft of the steered wheels 4, as tire force acting on the steered wheels 4, based on the rack axial force estimation value RFe. Specifically, the observed value computing unit 51 computes the kingpin torque Tkpa as an observed value as the product of the rack axial force estimation value RFe approximated by tie-rod force acting in the axial direction of the tie rods 19, and a knuckle arm length that is determined by the specifications of the vehicle A. It is known that the kingpin torque Tkpa as the observed value can be approximated by adding a tire aligning torque to a product of a tire lateral force and a caster trail. The observed value computing unit 51 then computes a third-order observable y [ay, r, Tkpa] (3×1 matrix) of which the lateral acceleration ay, the yaw rate r, and the kingpin torque Tkpa are observed values. The observable y thus obtained is output to a subtracter 54.

A rotational angle θm, the vehicle speed value V, and the Kalman gain K are input to the estimation value computing unit 52. The estimation value computing unit 52 computes the state estimate xe and the observation estimate ye based on a two-degree-of-freedom bicycle model for example, as a dynamics model of the road surface friction coefficient, i.e., as a model including the road surface friction coefficient as a variable, taking the rotational angle θm and the vehicle speed value V as a later-described input quantity u. The estimation value computing unit 52 computes a third-order state estimate xe [βe, re, μe] (3×1 matrix) of which a body slip angle estimation value βe that is information estimating a body slip angle β, a yaw rate estimation value re that is information estimating the yaw rate r, and the road surface friction coefficient estimation value μe, are estimation values. Note that the body slip angle β is an angle about a vertical axis that passes through the center of gravity of the vehicle A, between the front-rear direction of the vehicle A and the direction of travel of the vehicle. The state estimate xe computed as described above is output to the devices 2, 41 as information representing the road surface friction coefficient estimation value μe. In the present embodiment, the state estimate xe is set having the body slip angle estimation value βe as a state variable such that the body slip angle β can be taken into consideration when controlling operations of the vehicle A. Also, in the present embodiment, the state estimate xe is set having the yaw rate estimation value re as a state variable such that the yaw rate r can be offset, various types of noise can be removed, and so forth.

The estimation value computing unit 52 also computes a third-order observation estimate ye [aye, re, Tkpae] (3×1 matrix) of which a lateral acceleration estimation value aye that is information estimating the lateral acceleration ay, the yaw rate estimation value re, and a kingpin torque estimation value Tkpae that is information estimating the kingpin torque Tkpa, are estimation values. The observation estimate ye obtained as described above is subtracted from the observable y through the subtracter 54, yielding an observation deviation Δy that is output to the gain computing unit 53.

The observation deviation Δy is input to the gain computing unit 53. Based on the observation deviation Δy that is the error of the observation estimate ye as to the observable y, the gain computing unit 53 computes a Kalman gain K having functions of adjusting the amount of correction of the estimation value computing unit 52 correcting the state estimate xe so as to reduce the observation deviation Δy. The Kalman gain K obtained as described above is output to the estimation value computing unit 52.

Then, in the present embodiment, the road surface friction coefficient estimating device 40 configures an extended Kalman filter EKF that is a type of nonlinear Kalman filter, from the observed value computing unit 51, the estimation value computing unit 52, and the gain computing unit 53, as means to compute the state estimate xe, and configures an estimation observer using this extended Kalman filter EKF.

Next, in the present embodiment, the extended Kalman filter EKF that the road surface friction coefficient estimating device 40 configures will be described in detail. Note that in the following description, the parentheses "( )" around signs in FIG. 3 indicate time point, and the hyphens "-" indicate a state estimated based on information from the previous time with respect to the present.

Figure 3:
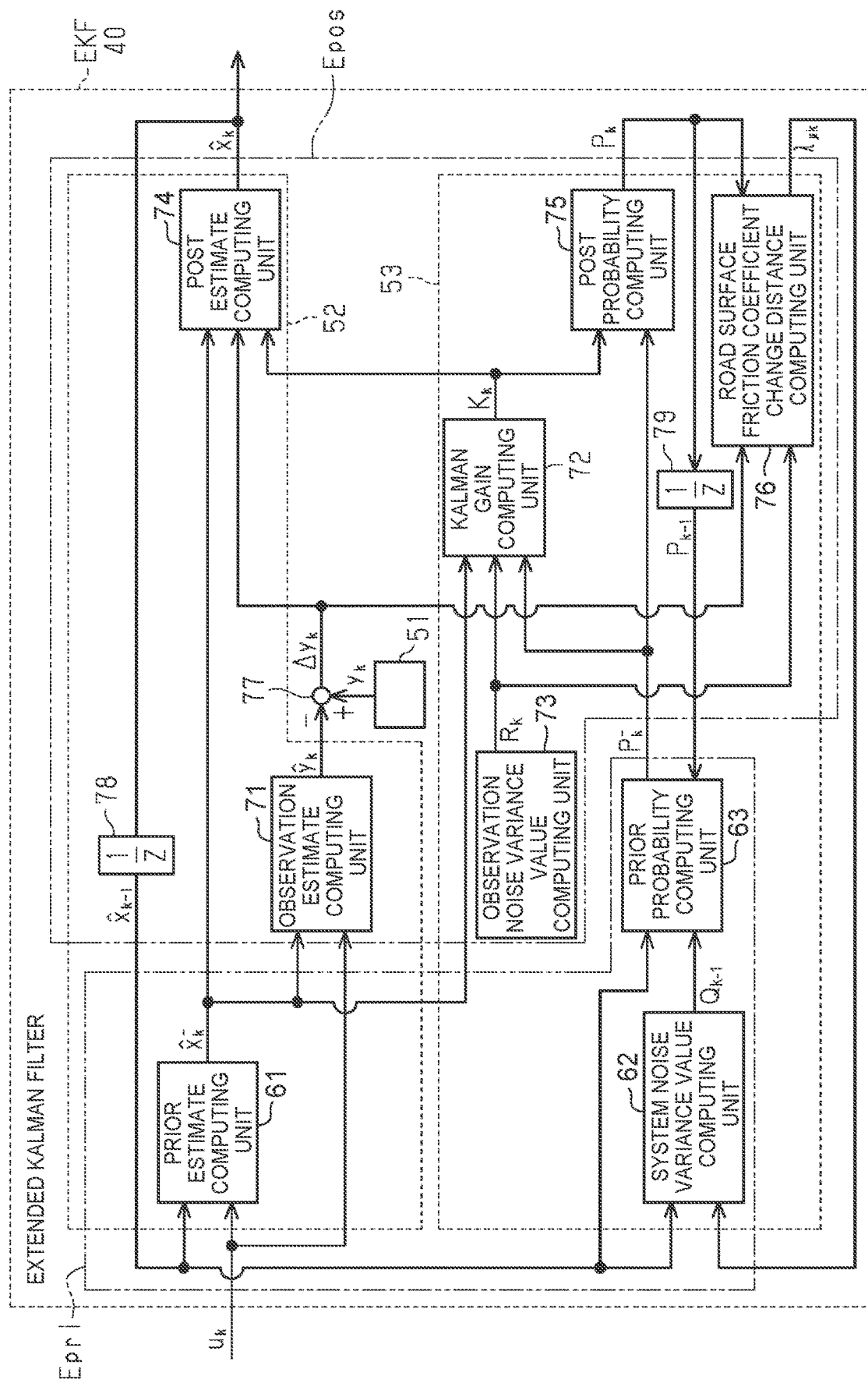
FIG. 3 is a block diagram illustrating functions of an extended Kalman filter that the road surface friction coefficient estimating device configures.

As illustrated in FIG. 3, the extended Kalman filter EKF performs processing of prior estimation by predicting the present state based pm information from the previous time with respect to the present, and processing of updating the state predicted through the prior estimation to modify the predicted state, i.e., correcting and performing post estimation, in order to compute a present state estimate xe(k). That is to say, the extended Kalman filter EKF performs prior estimation and corrects the results of prior estimation through the post estimation, which is repeated, and as a result, a state estimate xe that is closer to the actual value can be computed.

Now, the extended Kalman filter EKF sets a predetermined equation of motion defined based on a model that includes the road surface friction coefficient as a variable, as an equation of state f(x, u) used to compute the state estimate xe, and discretizes the equation of motion to yield the following Expression (1), which is set. It is sufficient for the predetermined equation of motion to correlate a second-order input quantity u [θt, V] (2×1 matrix) of a steered angle θt that is information of the steering angle of the steered wheels 4 computed from the rotational angle θm, and the vehicle speed value V, and a third-order state quantity x [β, r, μ] of the body slip angle β, the yaw rate r, and the road surface friction coefficient, for example.

$$x_k = f(x_{k-1}, u_k) + w_k \qquad \text{Expression (1)}$$

In Expression (1), the state quantity x is results obtained by adding, to the equation of state f(x, u), a system noise w that is error occurring with regard to models and variables the equation of state f(x, u) may include.

Also, the extended Kalman filter EKF sets a predetermined equation of motion defined based on a model that includes the road surface friction coefficient as a variable, as an observation equation h(x, u) used to compute the state estimate xe, and discretizes the equation of motion to yield the following Expression (2), which is set. It is sufficient for the predetermined equation of motion to correlate the state quantity x and the input quantity u [θt, V] (2×1 matrix) and observable y [ay, r, Tkpa], for example.

$$y_k = h(x_k, u_k) + v_k \qquad \text{Expression (2)}$$

In Expression (2), the observable y is results obtained by adding, to the observation equation h(x, u), observation noise v that is error at the time of observation the observation equation h(x, u) may include.

Note that various methods, such as integration and bilinear transform, may be employed as methods for discretization to derive Expression (1) and Expression (2). The extended Kalman filter EKF is provided with a prior estimation processing unit Epri that performs prior estimation primarily using the above Expression (1), and a post estimation processing unit Epos that performs post estimation primarily using the above Expression (2) in which the results obtained by the above Expression (1) are reflected. Based on a state estimate xe(k−1) before a time point "k" that is the present, i.e., at a time point "k−1" that is the previous time as to the present, the prior estimation processing unit Epri performs prior estimation to compute a prior estimate x−e(k) that is a value predicting the value of the present time point "k", and a prior probability P− that is an index indicating the precision of estimation of the prior estimate x−e, based on the equation of state f(x, u). Based on the observable y(k) at the time point "k" that is the present, the observation estimate ye, and the prior probability P− computed by the prior estimation processing unit Epri, the post estimation processing unit Epos performs post estimation to correct the prior estimate x−e(k) computed by the prior estimation processing unit Epri and compute the state estimate xe(k) at the time "k".

Specifically, the prior estimation processing unit Epri is provided with a prior estimate computing unit 61 that computes the prior estimate x−e, a system noise variance value computing unit 62 that computes a system noise variance value Q as an index indicating the degree of variation of the system noise w, and a prior probability computing unit 63 that computes the prior probability P− as an index indicating the degree of variation of the prior estimate x−e. Note that in the present embodiment, the system noise variance value Q is a covariance value, and the prior probability P− is a covariance matrix.

The post estimation processing unit Epos is provided with an observation estimate computing unit 71 that computes the observation estimate ye, a Kalman gain computing unit 72 that computes the Kalman gain K, an observation noise variance value computing unit 73 that computes an observation noise variance value R as an index indicating a degree of variation of observation noise v, and a post estimate computing unit 74 that computes the state estimate xe as a post estimate. Also, the post estimation processing unit Epos is provided with a post probability computing unit 75 that computes a post probability P as an index indicating the degree of variation of the state estimate xe, and a road surface friction coefficient change distance computing unit 76 that computes a road surface friction coefficient change distance λμ as a friction coefficient change amount indicating the change amount of the actual road surface friction coefficient. Note that in the present embodiment, the observation noise variance value R is a covariance value, and the post probability P is a covariance matrix.

In the present embodiment, the prior estimate computing unit 61 of the prior estimation processing unit Epri and the observation estimate computing unit 71 and the post estimate computing unit 74 of the post estimation processing unit Epos correspond to the estimation value computing unit 52 in FIG. 2. Also, the system noise variance value computing unit 62 and the prior probability computing unit 63 of the prior estimation processing unit Epri and the Kalman gain computing unit 72, the observation noise variance value computing unit 73, the post probability computing unit 75, and the road surface friction coefficient change distance computing unit 76 of the post estimation processing unit Epos correspond to the gain computing unit 53 in FIG. 2. Note that the road surface friction coefficient change distance computing unit 76 is an example of a friction coefficient change amount computing unit.

Functions of the prior estimation processing unit Epri will be described below. A state estimate xe(k−1) at time point "k−1" as to the time point "k" computed by the post estimate computing unit 74, and the input quantity u(k) at time point "k", are input to the prior estimate computing unit 61. Based on the state estimate xe(k−1) and the input quantity u(k), the prior estimate computing unit 61 computes the prior estimate x−e(k) at the time point "k", using the following Expressions (3) and (4) according to the equation of state f(x, u) represented in Expression (1) above.

$$\hat{x}_k^- = f(\hat{x}_{k-1}, u_k) \qquad \text{Expression (3)}$$

$$f(\hat{x}_{k-1}, u_k) = \begin{bmatrix} \hat{\beta}_k \\ \hat{\gamma}_k \\ \hat{\mu}_k \end{bmatrix} = \qquad \text{Expression (4)}$$

$$\begin{bmatrix} \hat{\beta}_{k-1} + \left(\frac{2}{MV}(F_{yf}(\hat{\beta}, \hat{\gamma}, \hat{\mu}, \theta_t, V)\cos(\theta_t) + F_{yr}(\hat{\beta}, \hat{\gamma}, \hat{\mu}, V)) - \hat{\gamma}\right) t_s \\ \hat{\gamma}_{k-1} + \left(\frac{2}{I_f}(l_f F_{yf}(\hat{\beta}, \hat{\gamma}, \hat{\mu}, \theta_t, V)\cos(\theta_t) + F_{yr}(\hat{\beta}, \hat{\gamma}, \hat{\mu}, V))\right) t_s \\ \hat{\mu}_{k-1} \end{bmatrix}$$

In the present embodiment, the equation of state f(x, u) is an equation of motion defined based on a known two-degree-of-freedom bicycle model that is discretized. In the above Expression (4), "Fyf" represents a tire lateral force that is a force in the width direction of the vehicle A acting on the front-wheel tires from the road surface, "Fyr" represents a tire lateral force that is a force in the width direction of the vehicle A acting on the rear-wheel tires from the road surface, "M" represents vehicle weight, and "Iz" represents yaw inertia of the vehicle. Also, in the above Expression (4), "lf" represents the front-wheel wheelbase that is the distance in the front-rear direction of the vehicle from the center of gravity of the vehicle to the axle of the front wheels, and "lr" represents the rear-wheel wheelbase that is the distance in the front-rear direction of the vehicle from the center of gravity of the vehicle to the axle of the rear wheels. Functions for the tire lateral forces Fyf, Fyr are the known Fiala model, Brush model, and Magic Formula (MF) model, etc., including the road surface friction coefficient as a variable. The road surface friction coefficient herein correlates tire slip angles αf, αr of the front and rear wheels, which are angles about a vertical axis that passes through the center of gravity of the steered wheels 4, between the front-rear direction of the vehicle A and the direction of travel of the tires, and tire lateral forces Fyf, Fyr. In the above Expression (4), time points and hyphens have been omitted from the state estimate xe and the input quantity u in functions for the tire lateral forces Fyf, Fyr, for the sake of convenience.

Also, the tire slip angles αf, αr used in the functions for the tire lateral forces Fyf, Fyr are computed using the following Expressions (5) and (6) that define the relation between the body slip angle β, the wheelbases lf, lr, the yaw rate r, the steered angle θt, and the vehicle speed value V.

$$\alpha_f = \beta + \frac{l_f r}{V} - \theta_t \qquad \text{Expression (5)}$$

The prior estimate x–e(k) obtained as described above is output to the observation estimate computing unit 71, the Kalman gain computing unit 72, and the post estimate computing unit 74.

The state estimate xe(k–1) that is the same as that input to the prior estimate computing unit 61, and the road surface friction coefficient change distance λμ(k–1) at the time point "k–1" computed at the road surface friction coefficient change distance computing unit 76, are input to the system noise variance value computing unit 62. Based on the state estimate xe(k–1) and the road surface friction coefficient change distance μλ(k–1), the system noise variance value computing unit 62 computes the system noise variance value Q(k–1) at the time point "k–1", using the following Expressions (7), (8), and (9).

$$Q_{k-1} \overset{def}{=} \lambda_{\mu,k-1} F_{\mu,k-1} Q_{\mu,k-1} F_{\mu,k-1}^T \quad \text{Expression (7)}$$

$$F_{\mu,k-1} = \begin{bmatrix} 0 & 0 & \frac{\partial f_1}{\partial \mu} \\ 0 & 0 & \frac{\partial f_2}{\partial \mu} \\ \frac{\partial f_3}{\partial \beta} & \frac{\partial f_3}{\partial r} & \frac{\partial f_3}{\partial \mu} \end{bmatrix}_{\hat{x}_{k-1}} \quad \text{Expression (8)}$$

$$Q_{\mu,k-1} = \text{diag}\begin{bmatrix} 0 & 0 & \sigma_\mu^2 \end{bmatrix} = \begin{bmatrix} 0 & 0 & 0 \\ 0 & 0 & 0 \\ 0 & 0 & \sigma_\mu^2 \end{bmatrix} \quad \text{Expression (9)}$$

The above Expression (7) represents a definition of the system noise variance value Q(k–1), which is obtained by applying the road surface friction coefficient change distance λμ(k–1) as a coefficient to a term obtained by subjecting the system noise variance value Qμ(k–1) represented by the above Expression (9) to linear approximation using a Jacobian Fμ(k–1) represented by the above Expression (8) that relates to the road surface friction coefficient that is one of the state quantities x. The above Expression (8) represents the Jacobian Fμ(k–1) in the vicinity of the state estimate xe(k–1) with respect to the road surface friction coefficient. The above Expression (9) represents computing the system noise variance value Qμ(k–1) with respect to the road surface friction coefficient that is one from among the state quantities x, i.e., a road surface friction coefficient estimated variance value σμ^2, which is used as an index for indicating the degree of variation of the road surface friction coefficient estimation value μe. Note that the road surface friction coefficient change distance λμ will be described in detail later.

The system noise variance value Q(k–1) obtained as described above is output to the prior probability computing unit 63. The prior probability computing unit 63 receives input of the same state estimate xe(k–1) input to the prior estimate computing unit 61, the system noise variance value Q(k–1) computed at the system noise variance value computing unit 62, and the post probability P(k–1) at the time point "k–1" computed by the post probability computing unit 75. Based on the state estimate xe(k–1), the system noise variance value Q(k–1), and the post probability P(k–1), the prior probability computing unit 63 computes the prior probability P–(k) at time point "k" using the following Expressions (10) and (11).

$$P_k^- = F_{k-1} P_{k-1} F_{k-1}^T + Q_{k-1} \quad \text{Expression (10)}$$

$$F_{k-1} = \begin{bmatrix} \frac{\partial f_1}{\partial \beta} & \frac{\partial f_1}{\partial r} & \frac{\partial f_1}{\partial \mu} \\ \frac{\partial f_2}{\partial \beta} & \frac{\partial f_2}{\partial r} & \frac{\partial f_2}{\partial \mu} \\ \frac{\partial f_3}{\partial \beta} & \frac{\partial f_3}{\partial r} & \frac{\partial f_3}{\partial \mu} \end{bmatrix}_{\hat{x}_{k-1}} \quad \text{Expression (11)}$$

The above Expression (10) represents the prior probability P–(k) computed as the sum of a term obtained by subjecting the post probability P(k–1) to linear approximation using the Jacobian F(k–1) represented by the above Expression (11) defined in the vicinity of the state estimate xe(k–1) with respect to the state quantity x, and the system noise variance value Q(k–1) represented by the above Expression (7).

The prior probability P–(k) obtained as described above is output to the Kalman gain computing unit 72 and the post probability computing unit 75. As described above, the prior estimation processing unit Epri estimates the prior estimate x–e, but the prior estimate x–e contains error that occurs with regard to models and variables as represented in the above Expression (1), and accordingly computes the degree of precision of estimating the prior estimate x–e due to the effects thereof as the prior probability P–.

Next, the functions of the post estimation processing unit Epos will be described. The prior estimate x–e(k) computed at the prior estimate computing unit 61 and the input quantity u(k) that is the same as input to the prior estimate computing unit 61 are input to the observation estimate computing unit 71. Based on the prior estimate x–e(k) and the input quantity u(k), the observation estimate computing unit 71 computes the observation estimate ye(k) at the time point "k" using the following Expressions (12) and (13) according to the observation equation h(x, u) represented in the above Expression (2).

$$\hat{y}_k = h(\hat{x}_k^-, u_k) \quad \text{Expression (12)}$$

$$h(\hat{x}_k^-, u_k) = \begin{bmatrix} \hat{a}_{y,k} \\ \hat{r}_k \\ \hat{T}_{kpa,k} \end{bmatrix} = \quad \text{Expression (13)}$$

$$\begin{bmatrix} \frac{2}{M}\left(F_{yf}(\hat{\beta}, \hat{\gamma}, \hat{\mu}, \theta_t, V)\cos(\theta_t) + F_{yr}(\hat{\beta}, \hat{\gamma}, \hat{\mu}, V)\right) \\ r \\ 2\left(M_{zf}(\hat{\beta}, \hat{\gamma}, \hat{\mu}, \theta_t, V) - F_{yr}(\hat{\beta}, \hat{\gamma}, \hat{\mu}, \theta_t, V) t_{caster}\right) \end{bmatrix}$$

In the present embodiment, the observation equation h(x, u) is an equation of motion that correlates the prior estimate x–e(k) and the input quantity u(k), the lateral acceleration estimation value aye that is the observation estimate ye, the yaw rate estimation value re, and the kingpin torque Tkpa, that is discretized. In the above Expression (13), the functions for the tire lateral forces Fyf, Fyr are the known Fiala model, Brush model, and MF model, etc., including the road surface friction coefficient as a variable, in the same way as in the above Expression (4), for example. Note that time points and hyphens have been omitted from the state estimate xe and the input quantity u in functions for the tire lateral forces Fyf, Fyr, for the sake of convenience. In the above Expression (13), "Mzf" represents self-aligning torque, and "tcaster" represents caster trail.

The observation estimate ye(k) obtained as described above is subtracted from the observable y computed by the observed value computing unit 51 through a subtracter 77, yielding an observation deviation Δy(k) at the time point "k" that is output to the post estimate computing unit 74 and the road surface friction coefficient change distance computing unit 76.

The prior estimate x–e(k) computed at the prior estimate computing unit 61, the prior probability P–(k) computed at the prior probability computing unit 63, and the observation noise variance value R(k) computed at the observation noise variance value computing unit 73, are input to the Kalman gain computing unit 72. The observation noise variance value R is computed at the observation noise variance value computing unit 73 as a predetermined observation noise variance value R(k) obtained by subjecting to linear approximation using a predetermined Jacobian, and is a constant set in advance in the present embodiment. Based on the prior estimate x–e(k), the prior probability P–(k), and the observation noise variance value R(k), the Kalman gain computing unit 72 computes the Kalman gain K(k) at the time point "k" using the following Expressions (14) and (15).

$$K_k = P_k^- H_k^T (H_k P_k^- H_k^T + R_k)^{-1}$$ Expression (14)

$$H_k = \begin{bmatrix} \frac{\partial h_1}{\partial \beta} & \frac{\partial h_1}{\partial r} & \frac{\partial h_1}{\partial \mu} \\ \frac{\partial h_2}{\partial \beta} & \frac{\partial h_2}{\partial r} & \frac{\partial h_2}{\partial \mu} \\ \frac{\partial h_3}{\partial \beta} & \frac{\partial h_3}{\partial r} & \frac{\partial h_3}{\partial \mu} \end{bmatrix}_{\hat{x}_k^-}$$ Expression (15)

The above Expression (14) represents the Kalman gain K(k) computed by applying linear approximation using a Jacobian H(k) represented by the above Expression (15) defined in the vicinity of the prior state estimate x–e(k) with respect to the state quantity x. That is to say, the Kalman gain K(k) is obtained by multiplying the transposed matrix of the Jacobian H(k), and as a result, linear approximation is performed with the correction amount as a constant value on the same dimension as the state estimate xe.

The Kalman gain K(k) obtained as described above is output to the post estimate computing unit 74 and the post probability computing unit 75. The prior estimate x–e(k) computed at the prior estimate computing unit 61, the observation deviation Δy(k), and the Kalman gain K(k) computed at the Kalman gain computing unit 72, are input to the post estimate computing unit 74. Based on the prior estimate x–e(k), the observation deviation Δy(k), and the Kalman gain K(k), the post estimate computing unit 74 computes the state estimate xe(k) at the time point "k", using the following Expression (16).

$$\hat{x}_k = \hat{x}_k^- + K_k(y_k - \hat{y}_k)$$ Expression (16)

In the above Expression (16), "y(k)–ye(k)" indicates the observation deviation Δy(k).

The state estimate xe(k) obtained as described above is output to the prior estimate computing unit 61 as the state estimate xe(k–1) that is information of the previous time, stored at the time point "k–1" through a previous-time value storing unit 78. The state estimate xe(k) is also output to the devices 2, 41.

The prior probability P–(k) computed at the prior probability computing unit 63 and the Kalman gain K(k) computed at the Kalman gain computing unit 72 are input to the post probability computing unit 75. Based on the prior probability P–(k) and the Kalman gain K(k), the post probability computing unit 75 computes the post probability P(k) at the time point "k" using the following Expression (17).

$$P_k = (I - K_k H_k) P_k^-$$ Expression (17)

The above Expression (17) represents the post probability P(k) computed by subjecting the prior probability P–(k) to linear approximation using the Jacobian H(k) represented by the above Expression (15) defined in the vicinity of the prior state estimate x–e(k) with respect to the state quantity x. In this case, the Kalman gain K(k) is obtained by multiplying the transposed matrix of the Jacobian H(k), as represented in the above Expression (14). On the other hand, the Kalman gain K(k) is multiplied by the Jacobian H(k), and as a result, linear approximation is performed to give the correction amount on the same dimension as the state estimate xe.

The post probability P(k) obtained as described above is output to the prior probability computing unit 63 as post probability P(k–1) that is information of the previous time, stored at the time point "k–1" through a previous-time value storing unit 79. The post probability P(k) is also output to the road surface friction coefficient change distance computing unit 76.

The observation deviation Δy(k), the Jacobian H(k), the post probability P(k) computed at the post probability computing unit 75, and the observation noise variance value R(k) computed at the observation noise variance value computing unit 73, are input to the road surface friction coefficient change distance computing unit 76. Based on the observation deviation Δy(k), the Jacobian H(k), the post probability P(k), and the observation noise variance value R(k), the road surface friction coefficient change distance computing unit 76 computes the road surface friction coefficient change distance λμ(k) at the time point "k" using the following Expression (18).

$$\lambda_{\mu,k} = (y_k - \hat{y}_k)^T (H_k P_k^- H_k^T + R_k)^{-1} (y_k - \hat{y}_k)$$ Expression (18)

The above Expression (18) represents the road surface friction coefficient change distance λμ(k) computed using an index that represents the degree of past variation with respect to the observation deviation Δy, which is computed as a positive definite symmetric matrix obtained by subjecting the prior probability P–(k) to linear approximation using the Jacobian H(k) represented by the above Expression (15) defined in the vicinity of the prior state estimate x–e(k) with respect to the state quantity x, and the observation deviation Δy. The above Expression (18) also represents, presuming that there is an information group configured of "(H)·(P–)·(H: transposed matrix)+R" that is an index indicating the degree of past variation regarding the observation deviation Δy(k), computing a Mahalanobis distance that quantitively indicates the degree of shift of a newly-obtained observation deviation Δy(k) from the information group. When the observation deviation Δy(k) shifts from the information group, this indicates that the environment of measuring the observable y, i.e., the actual road surface friction coefficient of the road surface over which the vehicle A is traveling, has changed. That is to say, in the present embodiment, the degree of shift of a newly-obtained observation deviation Δy as to an index indicating the degree of variation of observation deviation Δy(k) is used as the amount of change of friction coefficient indicating the amount of change of the actual road surface friction coefficient, that is to say, as the road surface friction coefficient change distance λμ.

The road surface friction coefficient change distance λμ(k) obtained as described above is output to the system noise variance value computing unit 62. As described above, the post estimation processing unit Epos corrects the state estimate xe using the Kalman gain K computed based on the observation deviation Δy, and computes the degree of precision of estimation of the state estimate xe as a result of correcting the state estimate xe, as the post probability P.

Operations of the present embodiment will be described below. According to the present embodiment, the observable y includes the road surface friction coefficient as a variable, and accordingly when there is change in the actual road surface friction coefficient, the effects thereof are manifested in the degree of variation regarding the observation deviation Δy, i.e., as the road surface friction coefficient change distance λμ. That is to say, the road surface friction coefficient change distance λμ can be used as an index of the degree of change of the road surface friction coefficient.

As represented in the above Expression (7), this road surface friction coefficient change distance λμ is computed as a coefficient of the system noise variance value Q such that the system noise variance value Q changes in proportion with change in the road surface friction coefficient change distance λμ.

Accordingly, when there is change in the actual road surface friction coefficient, the system noise variance value Q computed by adding in the road surface friction coefficient change distance λμ changes in proportion with the amount of change thereof. The change in the system noise variance value Q means that the Kalman gain K computed based on the system noise variance value Q changes. As a result, the state estimate xe, i.e., the road surface friction coefficient estimation value μe, is computed as a value corrected under the Kalman gain K in accordance with the road surface friction coefficient change distance λμ.

Figure 4A:
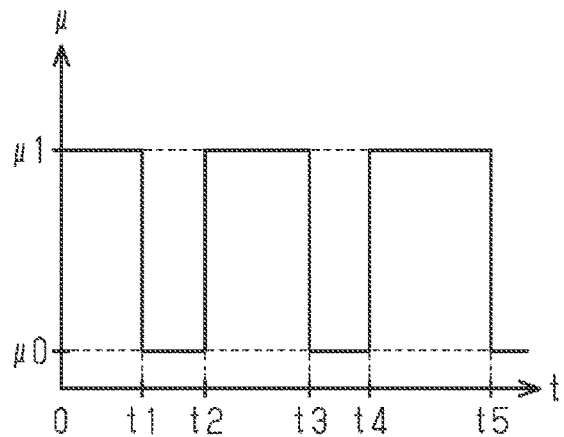
FIG. 4A is a diagram illustrating change in road surface friction coefficient.
Figure 4B:
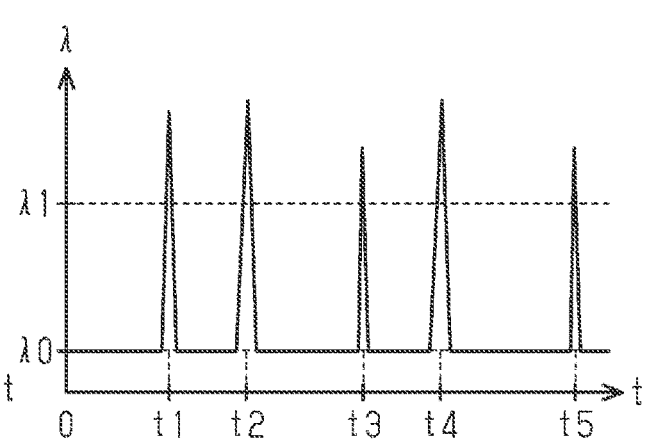
FIG. 4B is a diagram illustrating change in the amount of change of friction coefficient.

Specifically, when the vehicle A enters a frozen road from an asphalt road, for example, and the actual road surface friction coefficient changes, this change can be detected as the road surface friction coefficient change distance λμ in the present embodiment, as illustrated in FIGS. 4A and 4B.

In this case, as illustrated in FIG. 4A, with the value of the road surface friction coefficient of a frozen road as "μ0" and the value of the road surface friction coefficient of an asphalt road as "μ1", and the vehicle A repeatedly travels between an asphalt road and a frozen road at time points t1, t2, t3, t4, t5, for example, the road surface friction coefficient changes at each of these timings.

With a value when there is hardly any change in the road surface friction coefficient as "λ0" and a value when there is change in the road surface friction coefficient as "λ1", the change in these road surface friction coefficients is manifested as large peaks in which the road surface friction coefficient change distance λμ exceeds "λ1" at time points t1, t2, t3, t4, t5, as represented in FIG. 4B. Note that "λ1" is set to a value in a range obtained by experimentation as a value that can be used to determine that the vehicle A is traveling between an asphalt road and a frozen road. In conjunction with the great peaks manifested as the road surface friction coefficient change distance λμ, the Kalman gain changes to increase the amount of correction of the road surface friction coefficient estimation value μe, based on the system noise variance value Q to which the road surface friction coefficient change distance λμ is added.

Figure 5:
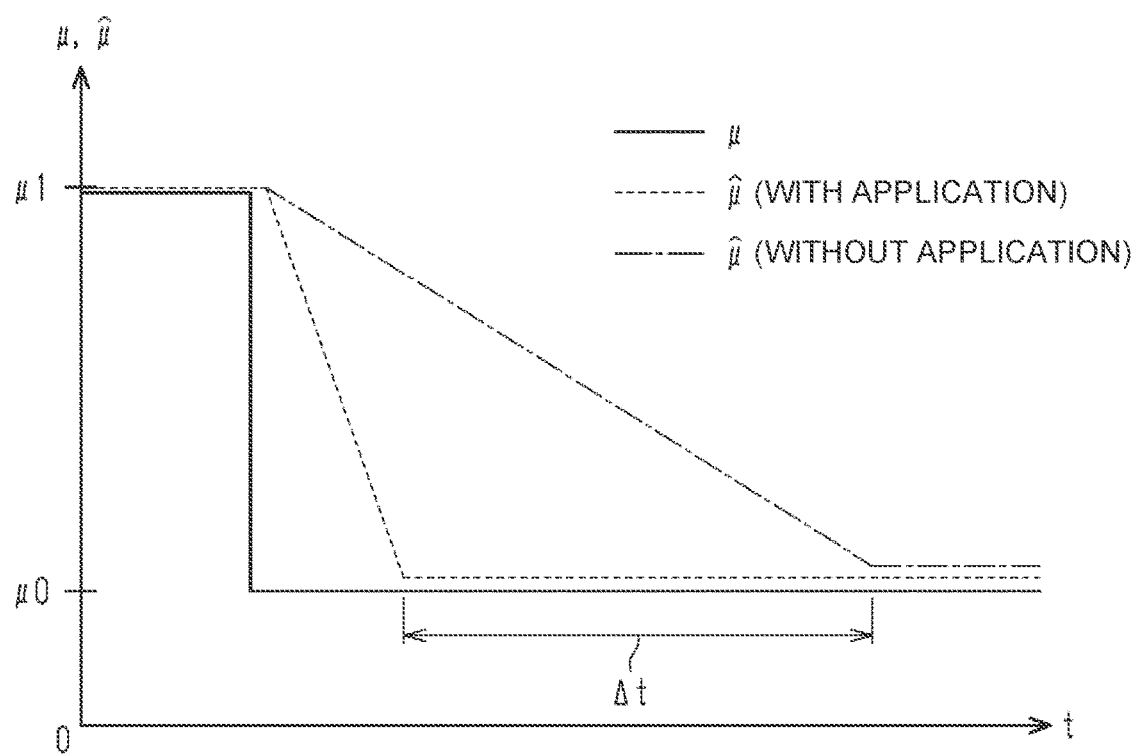
FIG. 5 is a diagram that compares application and non-application of the first embodiment with regard to estimation responsivity of a road surface friction coefficient estimation value.

In this case, if the road surface friction coefficient change distance λμ is great as indicated by the continuous line in FIG. 5, the estimation responsivity of the road surface friction coefficient estimation value μe can be increased when there is application of the present embodiment as indicated by the dashed line in FIG. 5, as compared to when there is no application of the present embodiment as indicated by the long dashed short dashed line in FIG. 5. That is to say, in the present embodiment, the estimation responsivity of the road surface friction coefficient estimation value μe can be temporarily increased at each of the time points t1, t2, t3, t4, t5 when the vehicle A repeatedly travels between an asphalt road and a frozen road.

The advantages of the present embodiment will be described below. In the present embodiment, in a situation in which the actual road surface friction coefficient greatly changes, the change can be quickly detected and this change can be promptly followed, as illustrated in FIG. 5. When there is application of the present embodiment, indicated by the dashed line in FIG. 5, the amount of time for following can be reduced by an amount of time corresponding to a time difference Δt as compared to when there is no application of the present embodiment, indicated by the long dashed short dashed line in FIG. 5. Accordingly, even in a situation when the actual road surface friction coefficient greatly and rapidly changes, deterioration in estimation precision of the road surface friction coefficient estimation value μe can be suppressed.

In the present embodiment, presuming that there is an information group configured of indices indicating the degree of past variation regarding the observation deviation Δy, the Mahalanobis distance, which is a distance that quantitatively indicates the degree of shift of a newly-obtained observation deviation Δy(k) from the information group, is used as the road surface friction coefficient change distance λμ.

The Mahalanobis distance has a feature in that distance can be quantitatively detected taking in to consideration correlation regarding the degree of shift of newly-obtained information as to a past information group. That is to say, according to the present embodiment, using the Mahalanobis distance as a coefficient of the system noise variance value Q enables the change in the actual road surface friction coefficient to be quantitatively reflected in the system noise variance value Q. Accordingly, change in the actual road surface friction coefficient is reflected in the Kalman gain K through the system noise variance value Q, and estimation responsivity corresponding to the change in the actual road surface friction coefficient is set. Accordingly, the road surface friction coefficient estimation value μe can be computed with an estimation responsivity appropriate for the change in the actual road surface friction coefficient.

Second Embodiment

In the present embodiment, an extended Kalman filter is employed as a nonlinear Kalman filter, which is advantageous in that the versatility of the road surface friction coefficient estimating device 40 is increased. Next, a second embodiment of the road surface friction coefficient estimating device will be described. Note that configurations and so forth that are the same as in the above-described embodiment are denoted by the same signs, etc., and repetitive description thereof will be omitted.

As illustrated in FIG. 6, a steering control device 101 according to the present embodiment is an arrangement that is not provided with the rack axial force estimating device 36 provided in the first embodiment. The steering device 1 according to the present embodiment has hub unit sensors 37 (a right-front-wheel sensor 37R on the right side and a left-front-wheel sensor 37L on the left side in FIG. 6), as various types of sensors. The right-front-wheel sensor 37R is provided to a right-side hub unit HR. The left-front-wheel sensor 37L is provided to a left-side hub unit HL. The right-front-wheel sensor 37R detects wheel speed, which is the rotation speed of the right-side steered wheel 4, and also detects force acting on the right-side steered wheel 4 as force occurring between the road surface and the right-side steered wheel 4. The left-front-wheel sensor 37L detects wheel speed, which is the rotation speed of the left-side steered wheel 4, and also detects force acting on the left-side steered wheel 4 as force occurring between the road surface and the left-side steered wheel 4.

Now, the front-wheel sensors 37R, 37L provided to hub units (see Japanese Unexamined Patent Application Publication No. 2009-133680 (JP 2009-133680 A), for example) will be described in detail, as one example. The hub unit sensors 37 are built inside the hub units HR, HL serving as bearing devices rotatably supporting the steered wheels 4 as to the body, along with an unshown drive shaft that transmits power from an internal combustion engine installed in the vehicle, as illustrated in FIG. 6. That is to say, the hub units HR, HL according to the present embodiment are hub units with sensor functions that can directly detect force acting on the steered wheels 4, as force generated between the road surface and the steered wheels 4.

Based on the force acting on the right-side steered wheel 4, the right-front-wheel sensor 37R computes each of a load Fx in the x-axis direction that is the front-rear direction of the vehicle A, a load Fy in the y-axis direction that is the width direction of the vehicle A, a load Fz in the z-axis direction that is the up-down direction of the vehicle A, a moment load Mx about the x axis, and a moment load Mz about the z axis. The same holds true for the left-front-wheel sensor 37L as well. The positive and negative directions of the various types of loads Fx, Fy, Fz, Mx, and Mz are the same between the front-wheel sensors 37R, 37L. The various types of loads Fx, Fy, Fz, Mx, Mz (expressed in units of N (Newtons) or Nm (Newton-meters)) change in accordance with state of the vehicle traveling, such as vehicle speed, and are components including elements such as vehicle speed.

In the present embodiment, the front-wheel sensors 37R, 37L output the tire lateral force Fyf that is information indicating the load Fy in the y-axis direction detected at the steered wheels 4, and the front-wheel moment load Mzf that is information indicating the load Mz about the z-axis, to a road surface friction coefficient estimating device 102.

That is to say, instead of the rack axial force estimation value RFe output from the rack axial force estimating device 36 being input, the tire lateral force Fyf and the front-wheel moment load Mzf obtained from the hub unit sensors 37 provided to the steered wheels 4 are input to the road surface friction coefficient estimating device 102 according to the present embodiment. That is to say, the road surface friction coefficient estimating device 102 computes the kingpin torque Tkpa of the observable y based on the tire lateral force Fyf and the front-wheel moment load Mzf input from the hub unit sensors 37 provided to the steered wheels 4.

In addition to effects and advantages corresponding to the effects and advantages of the above first embodiment, the present embodiment yields the following advantages. Using the tire lateral force Fyf and the front-wheel moment load Mzf obtained from the hub unit sensors 37 provided to the steered wheels 4 to compute the observable y as in the present embodiment, instead of using the rack axial force estimation value RFe output from the rack axial force estimating device 36, does away with friction loss at the suspension and steering parts. Accordingly, a kingpin torque Tkpa having a value with higher precision can be obtained. Accordingly, this is effective in improving estimation precision of the road surface friction coefficient estimation value µe.

The embodiments may be changed as follows. Also, note that the following other embodiments may be combined with each other insofar as there is no technical contradiction. In the above embodiments, other indices used in statistics such as Euclidean distance and standard deviation may be used instead of the road surface friction coefficient change distance λµ that is the Mahalanobis distance, as long as the degree of change of the road surface friction coefficient can be detected as an amount of change of friction coefficient.

In the above embodiments, a Jacobian relating to at least the road surface friction coefficient estimation value µe is sufficient as the Jacobian used to compute the system noise variance value Q represented in the above Expression (8), and a Jacobian relating to the state quantity x taking into consideration the body slip angle estimation value βe and yaw rate estimation value re may be set.

In the above embodiments, it is sufficient for the equation of state f(x) to be based on a model containing the road surface friction coefficient as a variable, and a vehicle model with a greater number of degrees of freedom may be used. In this case, the input quantity u(k) is changed so as to input variables based on the model used, for example.

In the above embodiments, it is sufficient for the functions for the tire lateral forces Fyf, Fyr in the equation of state f(x) to be based on a model containing the road surface friction coefficient as a variable, and a more complex model can be used.

In the above embodiments, it is sufficient for the observation equation h(x) to be based on a model containing the road surface friction coefficient as a variable, and a more complex model can be used. In this case, the input quantity u(k) is changed so as to input variables based on the model used.

In the above embodiments, the vehicle speed value V can also be computed from the wheel speed that is the rotation speed of the steered wheels 4 obtained from the hub unit sensors 37, as in the second embodiment, for example. Alternatively, when a Global Positioning System (GPS) sensor for receiving positioning signals from a GPS satellite is provided in the vehicle A, the vehicle speed value V may be computed from the GPS sensor.

In the above embodiments, it is sufficient for the state estimate xe to be at least the two orders of body slip angle estimation value βe and road surface friction coefficient estimation value µe, and the above-described yaw rate r may be an input quantity. Also, when the body slip angle θ can be measured by a slip angle sensor or a GPS sensor, the state estimate xe may be the one order of the road surface friction coefficient estimation value µe. Note that the tire slip angles αf, αr may be state estimates or input quantities instead of the body slip angle β. In such cases, the state quantity x, the observable y, and the observation estimate ye are changed in accordance with the change to the state estimate xe.

In the above embodiments, the steering device 1 may have functions of directly detecting the kingpin torque Tkpa, and for example, a force sensor such as a strain gauge may be provided to the tie rods 19.

In the second embodiment, it is sufficient to at least contain the road surface friction coefficient as a variable for the observable y, and a configuration may be made wherein four orders in which the tire lateral forces Fyf, Fyr are variables, instead of the kingpin torque Tkpa, for example. In this case, hub unit sensors that are the same as the hub unit sensors 37 provided to the steered wheels 4 are provided to the rear wheels as well. Alternatively, the observable y may take into consideration X-axis direction acceleration, or the load Fx in the x-axis direction that is the front-rear direction, for the observation equation h(x).

In the above embodiments, the time points taken into consideration in the computation represented in the Expressions may be changed as appropriate in accordance with the object, such as using the time point "k−1" of the previous time instead of the present time point "k", or using the present time point "k" instead of the time point "k−1" of the previous time.

In the above embodiments, it is sufficient for the road surface friction coefficient estimating devices 40, 102 to configure a nonlinear Kalman filter, and an unscented Kalman filter (UKF), and an ensemble Kalman filter (EnKF), etc, may be configured, for example.

In the above embodiments, the road surface friction coefficient estimating devices 40, 102 may be added as functions of the steering control device 2 or as functions of the central control device 41. In the above embodiments, it is sufficient for the road surface friction coefficient estimation value μe to be used in a way that traveling of the vehicle A stabilizes, and besides the above-described examples, the road surface friction coefficient estimation value μe can be used to adjust the distribution of drive force between right and left front wheels or rear wheels, for example.

In the second embodiment, it is sufficient for the hub units HR, HL to be configured to able to output at least the tire lateral force Fyf and the front-wheel moment load Mzf based on force acting on the steered wheels 4. The type of sensor of the front-wheel sensors 37R, 37L in the hub units HR and HL is irrelevant as long as such conditions are satisfied, and may be ultrasound detection types, magnetic detection types, contact types using strain gauges, and so forth.

In the second embodiment, the steering control device 101 may be provided with the rack axial force estimating device 36, in the same way as with the first embodiment. In the above embodiments, the CPU configuring the road surface friction coefficient estimating devices 40, 102 may be one or more processors executing a computer program, or one or more dedicated hardware circuits such as an application-specific integrated circuit executing at least part of the various types of processing, or a circuit including a combination of the processor and the dedicated hardware circuit. The memory may be configured from any type of usable media that is accessible by a general-purpose or dedicated computer. This holds true for the control devices 2, 41, 42, 43, 44, 101, such as the steering control device 2, as well.

In the above embodiments, the steering device 1 may be realized as a so-called rack-assisted steering device, in which rotations of the motor 27 are transmitted to the rack shaft 12, thereby imparting motor torque to the steering mechanism 5 as assist force. Also, the above embodiments may be realized as steer-by-wire steering devices, in which the force transmission path between the steering wheel 3 and the steered wheels 4 is of a separable structure. In this case, the force transmission path between the steering wheel 3 and the steered wheels 4 may have a structure that is mechanically separated at all times, or may have a structure that is separable by a clutch.

What is claimed is:

1. A road surface friction coefficient estimating device configured to compute a road surface friction coefficient estimation value that is an estimation value of a road surface friction coefficient of a road surface using a nonlinear Kalman filter having an observed value containing the road surface friction coefficient as a variable, the road surface friction coefficient estimating device comprising an electronic control unit, wherein:

the electronic control unit is configured to compute a system noise variance value as an index indicating a degree of variation in the road surface friction coefficient estimation value as an index, the electronic control unit is configured to compute an observation noise variance value as an index indicating a degree of variation in observation noise being noise that the observed value contains, the electronic control unit is configured to compute, with regard to an observation deviation, an index indicating a degree of shift of the observation deviation that is newly obtained as to an index indicating a degree of past variation in the observation deviation, in which the observation deviation is deviation between an observation estimation value and the observed value, the observation estimation value being an estimation value of the observed value obtained in computation of the road surface friction coefficient estimation value, the electronic control unit is configured to compute the index as a friction coefficient change amount that indicates an amount of change of the road surface friction coefficient, the electronic control unit is configured to compute a Kalman gain that indicates a correction amount of the road surface friction coefficient estimation value in the nonlinear Kalman filter, based on the system noise variance value and the observation noise variance value, the electronic control unit is configured to add in the friction coefficient change amount when computing the system noise variance value, the friction coefficient change amount is computed as a coefficient of the system noise variance value such that the system noise variance value is proportionate to the friction coefficient change amount, and the friction coefficient change amount is, presuming that an information group configured of indices indicating the degree of past variation in the observation deviation exists, a Mahalanobis distance that quantitatively indicates the degree of shift of the observation deviation that is newly obtained as to the information group.

2. The road surface friction coefficient estimating device according to claim 1, wherein at least lateral acceleration and yaw rate occurring in a vehicle, and aligning torque at a center of steering when viewing a steered wheel of the vehicle from above, are included as the observed value.

3. The road surface friction coefficient estimating device according to claim 1, wherein the nonlinear Kalman filter is an extended Kalman filter.

* * * * *